Nov. 28, 1944.   W. DE C. CRATER   2,363,834

NITRATION APPARATUS

Filed June 30, 1942

WILLARD DeC. CRATER
INVENTOR.

BY

Patented Nov. 28, 1944

2,363,834

UNITED STATES PATENT OFFICE 2,363,834

NITRATION APPARATUS

Willard de C. Crater, Newark, Del., assignor to Hercules Powder Company, Wilmington, Del., a corporation of Delaware Application June 30, 1942, Serial No. 449,130

3 Claims. (Cl. 23—266)

This invention relates to an apparatus for continuous nitration and, more particularly, for the nitration of pentaerythritol to pentaerythritol tetranitrate.

The continuous preparation of pentaerythritol tetranitrate is known to the art. One method comprises dissolving the pentaerythritol in sulfuric acid, adding nitric acid, and passing the resulting solution vertically upwardly through a nitrator, which is provided with a cooling jacket and an agitator, the mixture and reacted material being allowed to overflow through an exit located adjacent the top of the nitrator. This process presents certain disadvantages, among which is the excessive height of apparatus required in order to obtain a given length of travel. In addition, the material merely rises to the top and overflows so that the time of contact is not desirably long and so that incomplete nitration frequently results. Furthermore, when using this process and apparatus, the reaction of nitration frequently gets out of control with objectionable consequences.

An apparatus for other types of nitration is known in which the starting materials are deposited directly in the nitrator and the contents of the nitrator circulated through tubes in the nitrator and the product allowed to flow out by means of an overflow. This apparatus is subject to the disadvantages that much of the starting material flows right out of the overflow without circulating and also a crust may form on the tubes which not only holds up operation but is dangerous to remove.

It is an object of the present invention to provide a safe, economical, and easily controlled apparatus for the continuous nitration of pentaerythritol.

Another object is to devise a procedure for the continuous nitration of pentaerythritol which avoids the disadvantages of the known processes and apparatus described above.

Another object is to provide for the obtaining of the necessary extent of contact between the reacting materials so as to insure complete nitration, while at the same time employing apparatus which is considerably more compact than that heretofore employed in the continuous nitration of pentaerythritol.

In accordance with the present invention, an apparatus for the continuous nitration of pentaerythritol has been devised in which the reacting materials are continuously delivered within a concentric baffle in the nitrating vessel, circulated about the baffle by mechanical agitation means, and the reaction products continuously discharged.

Having indicated in a general way the nature and purpose of the invention, there follows a more detailed description of the preferred embodiments thereof with reference to the accompanying drawing in which.

Figure 1:
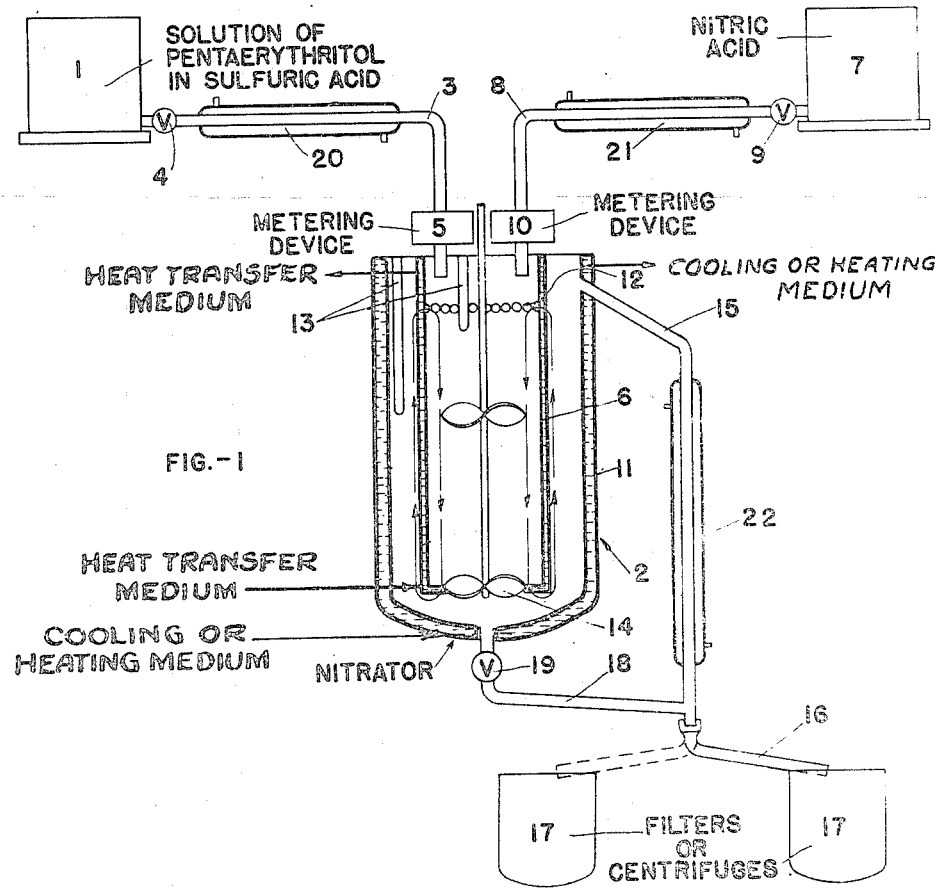
Fig. 1 is a cross sectional view of the nitrator apparatus with a diagrammatic showing of material supply, filters, etc.

In Fig. 1 of the drawing, there is shown the apparatus in accordance with the present invention as well as one process which may be used with it. Referring to this figure in detail, I designates a previously prepared supply of pentaerythritol in sulfuric acid which is fed to the nitrator 2 by means of line 3, which is provided with shut off valve 4, and with the metering device 5, the material being fed inside of the baffle 6 provided in the nitrator. 7 designates a nitric acid supply which is connected to the nitrator 2 by means of the line 8, provided with the shut off valve 9, and with the metering device 10, the nitric acid being simultaneously fed within the baffle 6. The nitrator 2 has the exterior cooling jacket 11, through which brine or other cooling medium or a heating medium may be passed as indicated in the drawing to control the temperature of reaction. The baffle may or may not be hollow for the passage of a heat transfer medium, such as a cooling medium therethrough. In the drawing a hollow baffle is shown, through which is circulated a heating or cooling medium as in the exterior jacket 11. The baffle 6 extends from a point above the level of the reaction mixture to a point adjacent the bottom of the nitrator and is provided near its top with a series of annularly disposed holes 12. Thermometer wells 13 are provided for reception of thermometers for the measurement of the temperature in the nitrator. A centrally located stirring device 14 is operated continuously to circulate the reaction mixture in the path indicated by the arrows. The crystal slurry is continuously overflowed through the jacketed overflow line 15 which is connected to the nitrator 2 at a point just above the level of the openings 12 in the baffle 6.

The overflow line 15 which leaves the nitrator at a point above the level of the holes 12 in the baffle, leads by means of a swing boot 16, to one of a plurality of filters or centrifuges 17 which serve to separate the crystals from the waste acid. The line 15 is provided with a cooling ket 22 for cooling the crystal slurry, which is from about 40° C. to about 60° C., and preferably at about 50° C., down to atmospheric temperature (say 20° C.) or below, say to about 10° or below, before entering the separating device 17. By lowering the temperature of the slurry, the amount of pentaerythritol tetranitrate dissolved in the waste acid is materially reduced thereby increasing the yield of pentaerythritol tetranitrate, and preventing the depositing of pentaerythritol tetranitrate in separating devices, equipment for subsequent handling of waste acid such as waste acid storage tanks, pipe lines, valves, etc., thereby substantially increasing the safety of the operation especially of crystal separation and waste acid recovery. In order to drain the nitrator upon shutting down, the line 18, having the normally closed shut off valve 19, is provided from the bottom of the nitrator to the line 15.

If desired, line 18 may be provided with a swing spout and be normally connected so as to discharge into a drowning tank containing a large volume of water, whereby in case of an emergency, the charge may be quickly dumped by opening valve 19. In such case, line 18 would be connected to discharge into the devices 17 only at the end of a nitrating operation.

Lines 3 and 8 may be provided with heat exchange jackets 20 and 21 respectively, whereby, under certain circumstances, either the pentaerythritol or the nitrating acid or both may be preheated to the desired extent, for example, to the reaction temperature of 40–60° C., on their way to the nitrator. In this way, the necessity for applying heat to the nitrator itself may be avoided with elimination of the dangers of the reaction getting out of control and of localized heating. The application of heat to the raw materials may be carried out thus with perfect safety. In some cases, pre-cooling of the nitrating acid or the pentaerythritol or both to below atmospheric temperature, say to 10° C. or below, may be effected by means of jackets 20 and 21 where the nitrating reaction tends to become uncontrollable, provided the pre-cooling is accompanied with maintenance of the reaction mixture in the nitrator at 40–60° C. Pre-cooling of the nitrating acid with supply of pentaerythritol at room temperature or at an elevated temperature is advantageous in some cases.

The stirring device 14 is preferably so adjusted in its size and speed of rotation as to cause the material to flow steadily and rapidly, but without much frothing, in a path downwardly in the baffle and up around it at such a rate that no starting material can flow out of the holes in the baffle but are first forced downwardly inside the baffle.

It will be seen that the space between the baffle and the jacket 11 is substantially unobstructed, that is, there are no tubes, fins, or other elements. This is particularly important since, when nitrating materials like pentaerythritol, a crust is likely to form on any obstructions which may be in the path of the material. This impedes the flow as well as being dangerous to remove.

Figure 2:
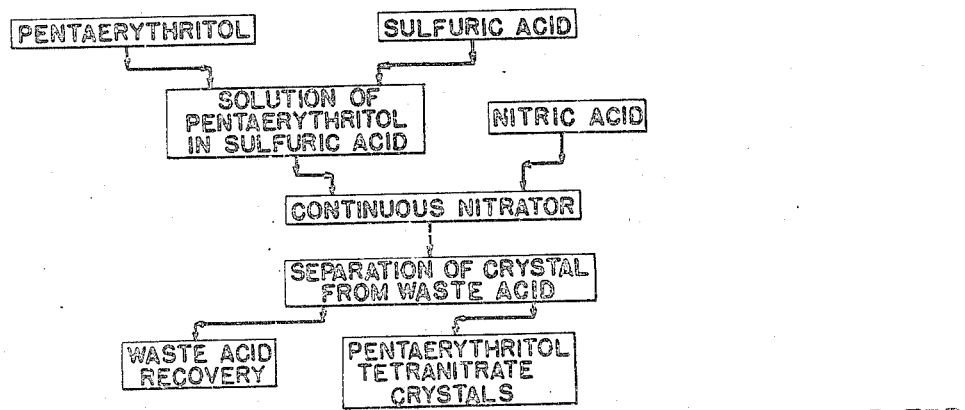
Fig. 2 is a flow diagram of one process which may be carried out in the apparatus.

In one process which has been carried out with this apparatus and which is represented by the flow diagram at Fig. 2, the pentaerythritol to be nitrated is first dissolved in concentrated sulfuric acid of a strength of from 90–100% and preferably of at least 93.5%. The solution of pentaerythritol in sulfuric acid and the nitrating acid which is either concentrated nitric acid or a mixture of concentrated nitric and sulfuric acids, are separately and continuously introduced to the nitrator by means of suitable metering devices. These materials are introduced adjacent the top of the nitrator and within the cylindrical baffle which is disposed concentrically in the nitrator. During the process, an agitator disposed centrally of the baffle, is in continuous operation and continuously circulates the materials downwardly inside of the baffle, thence upwardly on the outside thereof, thence inwardly through openings adjacent the top of the baffle, etc. in an extended path of intimate contact. The mixture is continuously overflowed through an overflow exit which is provided in the outer wall of the nitrator at a point at substantially the same level as the point of introduction and slightly above the openings in the baffle.

Preferably the nitrator is jacketed and cooling or heating fluid is circulated therearound continuously during the nitration so as to maintain the temperature in the nitrator at the desired point.

It is preferred to employ a nitrator wherein the ratio of inside depth to inside diameter is at least 4:1, so that the desired completeness of nitration is obtained. By providing for the circulation of the material downwardly and then upwardly, the nitrator needs be only about half as high as would be necessary were the reacting materials merely passed in one direction. In addition, by the continuous recirculation of the material, the greater part is recirculated a number of times and the material is prevented from passing directly from the introduction point to the overflow without having intimately contacted the remainder of the material for the necessary period of time to obtain complete nitration.

The mixture which overflows through the overflow is a slurry of crystals of pentaerythritol tetranitrate in waste acid and contains very little, if any, unreacted pentaerythritol. This slurry is continuously overflowed at the withdrawal point and passed to suitable means for separating the crystals from the waste acid. The crystals are thereafter treated in any suitable manner to purify them, and the waste acid is passed to the usual waste acid recovery system employed in nitrating plants. The yield of product is good and the product itself is of exceptionally high stability and purity, the process of nitration being such as to preclude the possibility of the formation of the dangerous unstable double sulfonitric ester of pentaerythritol, and therefore producing a product which is free from this objectionable double compound.

From the foregoing, it will be seen that the apparatus is capable of very satisfactory control and that the mode of introduction of materials to, circulation in, and withdrawal from the nitrating zone are such that it is impossible for either of the added liquids to pass directly from the point of introduction to the withdrawal point without having first intimately contacted the other liquid for a prolonged period of time. Thus, conditions are such that complete nitration is assured before the material is withdrawn. Conditions of control are such that the danger of formation of the double sulfo-nitric ester is eliminated and an unusually stable and pure product results. In addition, the provision for cooling the overflowed crystal slurry greatly enhances the yield of pentaerythritol tetranitrate and safety of the operation.

While the apparatus of the present invention has been described in connection with a certain process, it is not meant to be limited thereby. The apparatus may have varied uses but it was particularly designed for continuous nitration of explosive compositions. It has been found particularly useful, for instance, in the process described in my copending application, Serial No. 340,558, filed June 14, 1940, wherein there is described and claimed a process in which solid pentaerythritol is treated with nitric acid in the nitrator instead of a sulphuric acid solution of pentaerythritol as illustrated in the present specification.

This application is a continuation-in-part of my application Serial No. 340,559, filed June 14, 1940.

What I claim and desire to protect by Letters Patent is:

1. A continuous nitration apparatus comprising a nitrating vessel, overflow means in said vessel for maintaining a predetermined liquid level, a concentric baffle forming an inner chamber within said vessel and extending from a point above the overflow means to a point adjacent the bottom of said vessel, openings in said baffle below the overflow outlet and adjacent thereto, means for delivering nitrating acid and nitratable material within said baffle at a point above the openings of said baffle, agitator means for circulating fluid through said openings from without to within said baffle, the walls of said vessel and said baffle defining a substantially unobstructed space between them.

2. A continuous nitration apparatus comprising a nitrating vessel, overflow means in said vessel for maintaining a predetermined liquid level, a concentric baffle forming an inner chamber within said vessel and extending from a point above the overflow means to a point adjacent the bottom of said vessel, openings in said baffle below the overflow outlet and adjacent thereto, means for delivering nitrating acid and nitratable material within said baffle at a point above the openings of said baffle, agitator means for circulating fluid through said openings from without to within said baffle, means within the walls of the baffle for regulating the temperature of the reacting mixture, the walls of said vessel and said baffle defining a substantially unobstructed space between them.

3. An apparatus for the continuous nitration of pentaerythritol comprising a nitrating vessel, overflow means in said vessel for maintaining a predetermined liquid level, a concentric baffle forming an inner chamber within said vessel and extending from a point above the overflow means to a point adjacent the bottom of said vessel, openings in said baffle below the overflow outlet and adjacent thereto, means for delivering nitrating acid and nitratable material within said baffle at a point above the openings of said baffle, agitator means for circulating fluid through said openings from without to within said baffle, said circulating means comprising an impeller mechanism for rapidly propelling the fluid downward in said baffle, means within the walls of the baffle for regulating the temperature of the reacting mixture, the walls of said vessel and said baffle defining a substantially unobstructed space between them.

WILLARD DE C. CRATER.